UNITED STATES PATENT OFFICE.

OTTO BRACH, OF BERLIN, GERMANY.

POROUS MASS FOR BLOTTING PURPOSES AND FOR MAKING CIGAR-PIPES, &c.

SPECIFICATION forming part of Letters Patent No. 347,565, dated August 17, 1886.

Application filed February 18, 1886. Serial No. 192,445. (No specimens.)

*To all whom it may concern:*

Be it known that I, OTTO BRACH, of Berlin, Germany, have invented a new and Improved Porous Mass for Blotting Purposes and for Making Tobacco or Cigar Pipes and Similar Objects, of which the following specification is a full, clear, and exact description.

The hereinafter-described porous mass is particularly fit for manufacturing tobacco-pipe bowls or cigar-pipes, in which the humidity caused by smoking is absorbed by the material of the pipe, (dry smoking.) The mass can also advantageously be used for making ink-absorbers. This mass is composed of fine-grained vitreous sand which has been washed several times, coarse sand, pipe-clay, and hogs' bean meal. The proportions in which these four ingredients are mixed are (a) vitreous sand in four granulations from eighty-four to eighty-six per cent.; (b,) coarse river-sand in four granulations from eleven to eight per cent; (c,) pipe-clay from 4 to 5.1 per cent.; (d,) hogs' bean meal from 1 to 0.9 per cent.

The process of making this mass is as follows: The vitreous sand is ground in a dry or wet state in four different degrees of thickness. The coarse river sand is treated in the same way. The pipe-clay is diluted so as to become as liquid as water and passed through a narrow brass-wire seive. The hogs' bean meal is stirred to a paste and the pipe-clay mixed therewith. The sand, meal, and the coarse river sand of different thickness are added now, and the mass thoroughly kneaded during a certain space of time, adding from time to time a little water. The thus worked mass is then put into the molds to obtain the objects to be produced, (tobacco-pipe bowls, cigar-pipes, and ink-absorbers.) These objects are then boiled in the vapor-furnace until they have reached such a degree of stiffness that they can be lifted out of the molds and entirely dried in the drying-frame. When the thus formed objects are perfectly dry, they are burned in a temperature which is nearly the same as that of the melting-point of silver.

I claim as my invention—

A porous compound consisting of vitreous sand, coarse river sand, pipe-clay, and hogs' bean meal, substantially as and in the proportions specified.

In testimony whereof I have signed my name to this specification in the presence of two subscribing witnesses.

OTTO BRACH.

Witnesses:
B. ROI,
O. WICHMANN.